United States Patent [19]

Lefeber

[11] Patent Number: 4,820,214
[45] Date of Patent: Apr. 11, 1989

[54] MARINE PROPULSION UNIT WITH SEAL BETWEEN WATER TUBE AND ADAPTER PLATE

[75] Inventor: Paul D. Lefeber, North Fond du Lac, Wis.

[73] Assignee: Brunswick Corporation, Skokie, Ill.

[21] Appl. No.: 173,183

[22] Filed: Mar. 24, 1988

[51] Int. Cl.⁴ .............................................. B63H 21/10
[52] U.S. Cl. .................... 440/88; 123/41.87 R
[58] Field of Search .................. 440/88, 89, 900, 76, 440/77; 123/41.82 R, 196 R, 196 CP, 196 P

[56] References Cited

U.S. PATENT DOCUMENTS

| | | | |
|---|---|---|---|
| 2,549,479 | 4/1951 | Kiekhaefer | 440/88 |
| 4,392,779 | 7/1983 | Bloemers et al. | 418/154 |
| 4,421,490 | 12/1983 | Nakahama | 440/88 |
| 4,684,351 | 8/1987 | Watanabe et al. | 440/89 |

FOREIGN PATENT DOCUMENTS 0209694 12/1983 Japan ..................................... 440/88

OTHER PUBLICATIONS

Mercury Marine Service Manual Parts Catalog, Part No. 90-13286, pp. 26 and 27, Aug. 1985.

Primary Examiner—Joseph F. Peters, Jr.
Assistant Examiner—Jesùs D. Sotelo
Attorney, Agent, or Firm—Andrus, Sceales, Starke & Sawall

[57] ABSTRACT

In an outboard marine propulsion unit (10) having a lower gearcase (18) with a water tube (28) supplying cooling sea water to a powerhead thereabove supported on an adapter plate (16) having a water passage (34) vertically non-aligned with the water tube, structure is provided for connecting and sealing the top of the water tube to the adapter plate. A first fitting (50) receives the top of the water tube in sealing relation. A second intermediate fitting (102) communicates with the first fitting and is sealed to the adapter plate along a horizontally extended oblong cavity area (40) having a first section (42) vertically aligned with the water tube, and a second section (43) vertically aligned with the water passage and the adapter plate. The intermediate fitting has an oblong groove (114) in its upper surface (112) surrounding an aperture (108) at one end thereof which is vertically aligned with the water tube, and being vertically aligned at its other end with the water passage in the adapter plate. A rubber O-ring (116) is conformed to the oblong groove and received therein and engages the underside of the adapter plate in sealing relation.

10 Claims, 2 Drawing Sheets

FIG. 4
PRIOR ART
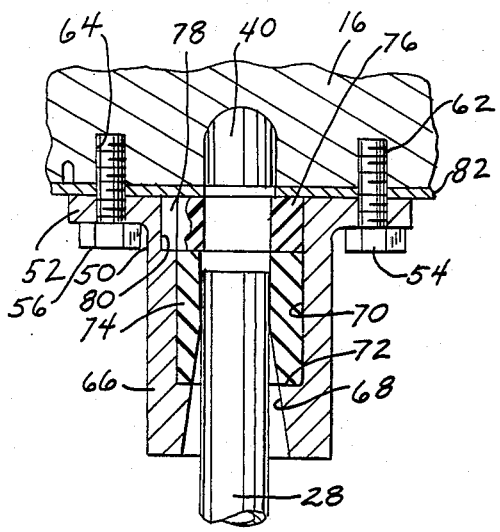
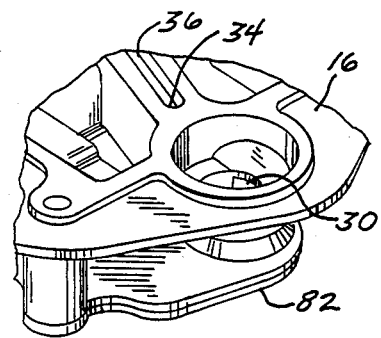
FIG. 5
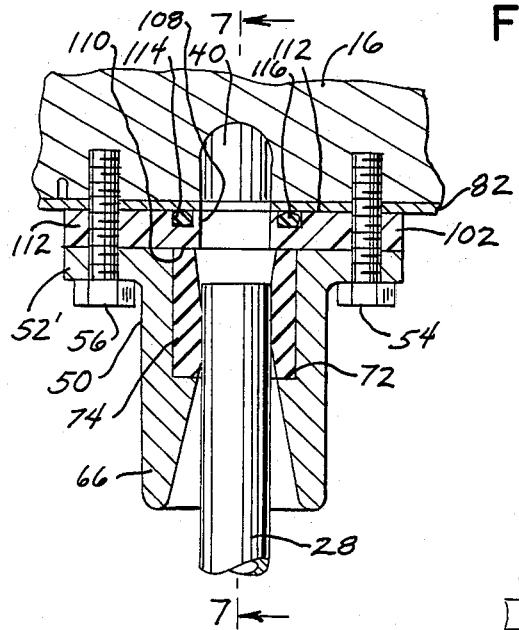
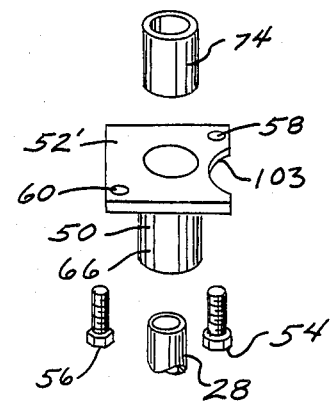
FIG. 6
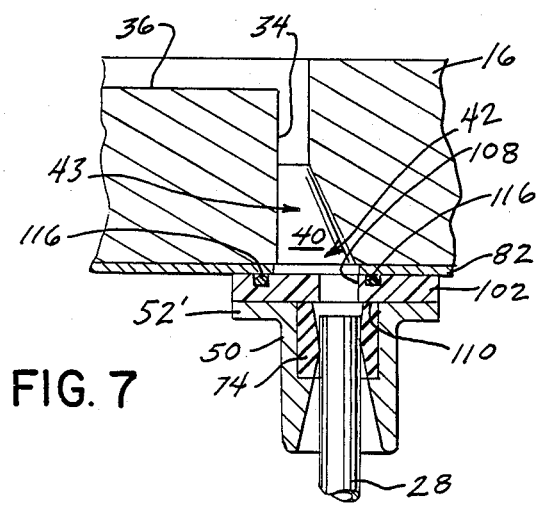
FIG. 7

4,820,214

MARINE PROPULSION UNIT WITH SEAL BETWEEN WATER TUBE AND ADAPTER PLATE

BACKGROUND AND SUMMARY

The invention relates to outboard marine propulsion units, and more particularly to the sealing structure between the water tube from the cooling sea water pump adn the adapter plate mounting the power head including an internal combustion engine.

An outboard marine propulsion unit has a lower gearcase with side openings supplying cooling sea water to a water pump driven by a vertical drive shaft in the gearcase. A water tube extends upwardly from the water pump to an adapter plate at the top of the gearcase which mounts the powerhead including the internal combustion engine. The adapter plate has a water passage supplying cooling sea water therethrough from the water tube to the powerhead. The sealing fittings connected the water tube to the adapter plate have been subject to leaking after certain assembly steps, particularly oven painting, which in turn has required that the mounting bolts for the fitting be retorqued.

The present invention provides improved sealing structure for connecting the water tube to the adapter plate which is particularly simple and easy to assemble, and solves leakage problems. The invention also maintains insulation between a copper water tube and an aluminum adapter plate to prevent a chemical reaction between the two.

BRIEF DESCRIPTION OF THE DRAWINGS

Prior Art

FIG. 4 is an assembled sectional view of a portion of the structure of FIG. 2.

Present Invention

FIG. 5 is an exploded perspective view of sealing structure in accordance with the invention.

FIG. 6 is an assembled sectional view of the structure in FIG. 5.

FIG. 7 is a sectional view taken along the line 7—7 of FIG. 6.

DETAILED DESCRIPTION

Prior Art

Figure 1:
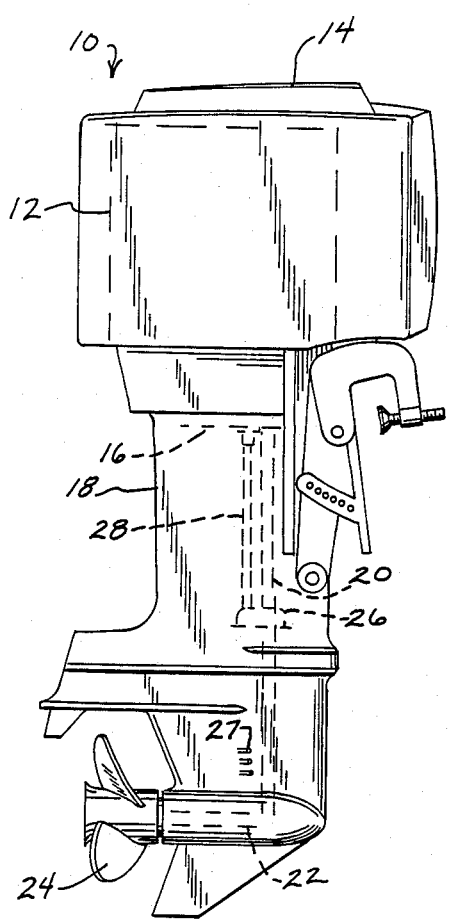
FIG. 1 shows a side view of an outboard marine propulsion unit.

FIG. 1 shows an outboard marine propulsion unit 10 having a powerhead 12 including an internal combustion engine and covered by cowl 14. The power head is mounted on an adapter plate 16 at the top of a lower gearcase 18 having a vertical drive shaft 20 driven by the powerhead and driving a lower horizontal propeller shaft 22 having a propeller 24 mounted thereto. The gearcase has apertures 27 in the sides thereof delivering cooling sea water to a water pump 26 which is driven by vertical drive shaft 20 extending therethrough, for example U.S. Pat. No. 4,392,779, incorporated by reference. Water tube 28 extends upwardly from water pump 26 to adapter plate 16 for delivering cooling sea water through a passage in the latter to the powerhead.

Figure 3:
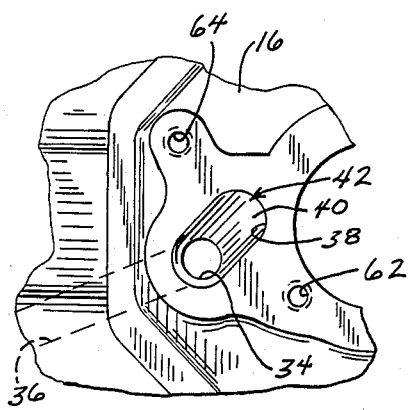
FIG. 3 is a sectional view taken along line 3—3 of FIG. 2.
Figure 2:
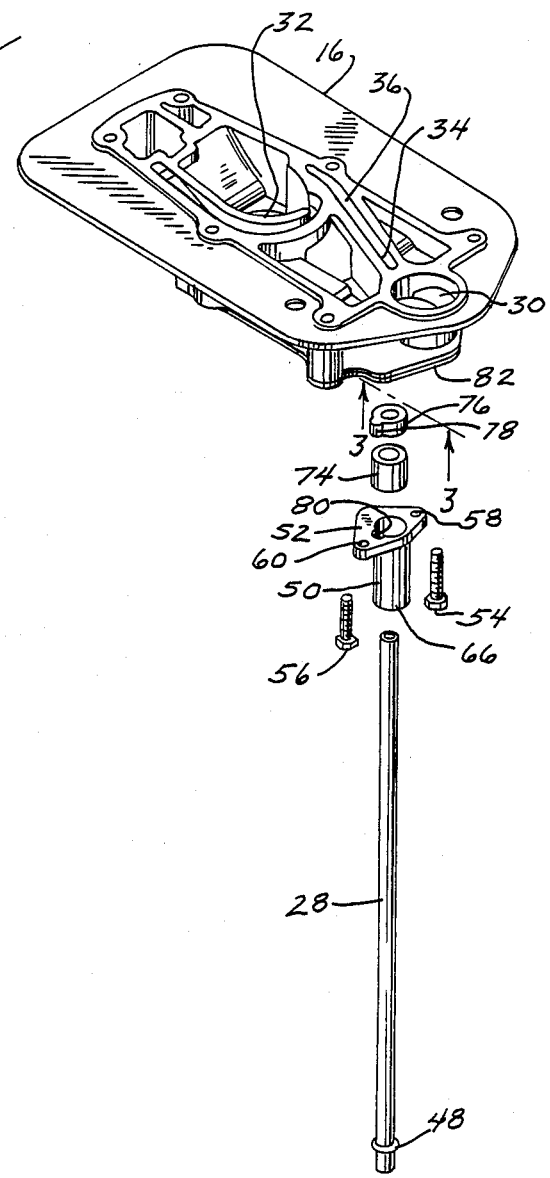
FIG. 2 is an exploded perspective view of an adapter plate, water tube and sealing structure known in the prior art.

FIG. 2 shows adapter plate 16, including drive shaft opening 30, engine exhaust passage 32, and cooling sea water passage 34 including extended passage 36 on the topside of the adapter plate, all as is known in the art, for example Mercury Marine Service Manual Parts Catalog Part No. 90-13286, pages 26 and 27, August 1985. Water passage 34 extends vertically through adapter plate 16, but is not vertically aligned with water tube 28. The water inlet on the bottom of the adapter plate, FIG. 3, has a horizontally extended oblong opening 38 defining a horizontally extended oblong entrance cavity 40 leading to through-passage 34 extending vertically upwardly therefrom to pass cooling sea water upwardly therethrough to the powerhead. As above noted, water tube 28 and through-passage 34 in the adapter plate are vertically non-aligned. Water tube 28 is vertically aligned with a portion 42 of entrance cavity 40 offset from through-passage 34. This offset is also shown in FIG. 7.

Water tube 28 is sealed at its lower end by a rubber grommet 44 to water pump 26. The grommet is force fit into opening 46 of the water pump and receives and grips annular shoulder 48 of the water tube. The top end of the water tube is connected and sealed to the adapter plate by the structure shown in FIGS. 2 and 4. A tubular fitting 50 has an upper flange 52 mounted to the adapter plate by bolts 54 and 56 extending through apertures 58 and 60 in the flange upwardly into threaded openings 62 and 64 in adapter plate 16. Fitting 50 has a lower depending tubular portion 66 receiving the upper end of water tube 28 therein. Tubular portion 66 has a reduced inner diameter central section 68, FIG. 4, and an enlarged inner diameter upper section 70 meeting at a stop shoulder inner diameter interface 72. The reduced inner diameter of central section 68 is larger than the outer diameter of tube water tube 28. A rubber annular sealing grommet 74 is disposed within tubular portion 66 at upper section 70 concentrically around and engaging water tube 28. Another grommet 76 is also disposed in upper section 70 of tubular portion 66 of fitting 50 on top of grommet 74 and keyed at key 78 in keyway 80 of the fitting. The top of grommet 76 bears against a gasket 82 along the underside of the adapter plate. Upon tightening of bolts 54 and 56, grommet 76 is pressed against the gasket and adapter plate which in turn compresses grommet 74 against shoulder 72 to compress grommet 74 radially inwardly into tight sealing engagement with the outer diameter of water tube 28.

Present Invention

FIGS. 5–7 show sealing structure in accordance with the invention for connecting the top of water tube 28 to adapter plate 16, the use like reference numerals from FIGS. 1–4 where appropriate to facilitate clarity. An intermediate fitting 102 is provided between the upper flange 52' of fitting 50 and adapter plate 16. Flange 52' is similar to flange 52 of FIG. 2 except that it has a substantially square shape with a cut-out 103 for clearance of drive shaft 20. Intermediate flange 102 is a hard plastic flat planar member sandwiched between flange 52' of fitting 50 and adapter plate 16. Threaded mounting bolts 54 and 56 extend upwardly through apertures 58 and 60 of flange 52' and through apertures 104 and 106 of fitting 102 and upwardly into adapter plate 16.

Fitting 102 has an aperture 108 therethrough vertically aligned with water tube 28. Fitting 102 has a lower surface 110, FIG. 6, around aperture 108 engaging the top of annular sealing grommet 74 compressing the latter against stop shoulder 72 to expand grommet 74 radially inwardly into tight sealing engagement with the outer diameter of water tube 28. Fitting 102 has an upper surface 112 with a groove 114 defining a horizontally extended oblong perimeter around aperture 108 which is at one end of the oblong configuration of groove 114. The horizontally extended oblong perimeter of groove 114 is vertically aligned with oblong entrance cavity 40 of adapter plate 16 but extends horizontally therebeyond, FIG. 7.

A sealing rubber O-ring 116 is conformed to the shape of groove 114 and received therein to have a horizontally extended oblong shape. The oblong O-ring 116 is compressed in sealing relation against the bottom of adapter plate 16, FIGS. 6 and 7, and surrounds oblong entrance cavity 40 horizontally outwardly of oblong entrance opening 38. Gasket 82 along the underside of the adapter plate may be left in place as shown in FIG. 6 and 7, or may be depleted at the area around opening 38.

As seen in FIG. 7, horizontally extended cavity area 40 has a rightward section 42 vertically aligned with water tube 28, and a leftward section 43 vertically aligned with water passage 34. Cooling sea water flows upwardly from water tube 28 through aperture 108 in fitting 102 and into cavity 40 and then laterally horizontally in the cavity and then upwardly through through-passage 34 in the adapter plate.

Water tube 28 is copper, and adapter plate 16 is aluminum. The sealing structure in FIGS. 5–7 retains separation and insulation of the copper water tube from the aluminum adapter plate, as in FIGS. 1–4, to prevent a chemical reaction between the two.

It is recognized that various equivalents, alternatives and modifications are possible within the scope of the appended claims.

I claim:

1. An outboard marine propulsion unit having a lower gearcase with a water tube supplying cooling sea water to a powerhead including an internal combustion engine mounted on an adapter plate at the top of said gearcase, said adapter plate having a water passage which is vertically non-aligned with said water tube, sealing structure connecting said water tube to said adapter plate comprising a first fitting receiving the top of said water tube in sealing relation, a second fitting communicating with said first fitting and sealed to said adapter plate along a horizontally extended area having a first section vertically aligned with said water tube and a second section vertically aligned with said water passage in said adapter plate.

2. The invention according to claim 1 wherein said first fitting has a sealing grommet engaging the outer diameter of said water tube in sealing relation and engaging the underside of said second fitting in sealing relation, and wherein said second fitting has sealing means extending around and surrounding said extended area and engaging the underside of said adapter plate in sealing relation.

3. The invention according to claim 2 wherein said first and second fittings are mounted to said adapter plate by a pair of threaded bolts extending through both of said first and second fittings and into said adapter plate.

4. The invention according to claim 2 wherein said first fitting has an upper flange and a lower depending tubular portion receiving said water tube, said second fitting is a flat planar member sandwiched between said upper flange of said first fitting and said adapter plate, and second fitting has an opening therein aligned with said water tube in said depending tubular portion of said first fitting.

5. The invention according to claim 4 wherein said second fitting sits on top of said upper flange of said first fitting and compresses said grommet in said depending tubular portion of said first fitting.

6. The invention according to claim 2 wherein said sealing means includes a groove in the upper surface of said second fitting surrounding said extended area, and a sealing O-ring conforming to said groove and received therein and engaging the underside of said adapter plate in sealing relation.

7. The invention according to claim 6 wherein said adapter plate includes a gasket along its underside engaged by said O-ring.

8. An outboard marine propulsion unit comprising:
a powerhead including an internal combustion engine;
a lower gearcase having an adapter plate at the top thereof mounting said powerhead, and having a vertical drive shaft driven by said powerhead and driving a lower horizontal propeller shaft having a propeller mounted thereto;
a water pump in said gearcase driven by said vertical drive shaft, said gearcase having apertures in the sides thereof delivering cooling sea water to said water pump;
a water tube extending upwardly from said water pump for delivering cooling sea water to said powerhead;
a water inlet on the bottom of said adapter plate, said inlet having a horizontally extended opening defining a horizontally extended entrance cavity leading to a through-passage extending upwardly therefrom to pass cooling sea water upwardly therethrough, wherein said water tube and said through-passage in said adapter plate are vertically non-aligned, said water tube being vertically aligned with a portion of said entrance cavity offset from said through-passage;
a tubular fitting having an upper flange mounted to said adapter plate and having a lower depending tubular portion receiving the upper end of said water tube therein, said tubular portion having a reduced inner diameter central section and an enlarged inner diameter upper section meeting at a stop shoulder inner diameter interface, said reduced inner diameter being larger than the outer diameter of said water tube;
an annular sealing grommet in said lower depending tubular portion of said fitting at said enlarged inner diameter upper section and concentrically around and engaging said water tube;
an intermediate fitting between said upper flange of said tubular fitting and said adapter plate, said intermediate fitting having an aperture therethrough vertically aligned with said water tube, said intermediate fitting having a lower surface around said aperture and engaging the top of said annular sealing grommet to compress the latter against said stop shoulder inner diameter interface in said depending tubular portion of said tubular fitting to expand said grommet radially inwardly into tight sealing engagement with the outer diameter of said water tube, said intermediate fitting having an upper surface with a groove around said aperture and defining an outer periphery of horizontally extended configuration, the outer perimeter of said groove being vertically aligned with said entrance cavity in said adapter plate but extending horizontally therebeyond;

a sealing O-ring shaped to said horizontally extended configuration of said groove and received therein and compressed in sealing relation against the botton of said adapter plate and surrounding said entrance cavity, such that cooling sea water flows upwardly from said water tube through said aperture in said intermediate fitting into said entrance cavity and then horizontally in said cavity and then upwardly through said through-passage in said adapter plate.

9. The invention according to claim 8 wherein said upper flange of said tubular fitting is mounted to said adapter plate by a pair of threaded bolts extending upwardly through said upper flange and through said intermediate fitting into the bottom of said adapter plate.

10. The invention according to claim 9 wherein said adapter plate includes a gasket along its underside engaged by said intermediate fitting and said horizontally extended O-ring.

* * * * *